(12) United States Patent
Rao Karikurve et al.

(10) Patent No.: US 12,682,385 B2
(45) Date of Patent: Jul. 14, 2026

(54) METHOD, NON-TRANSITORY COMPUTER-READABLE MEDIUM, AND SYSTEM FOR INFERRING USER BRAND SENSITIVITY USING A MACHINE LEARNING MODEL

(71) Applicant: Maplebear Inc., San Francisco, CA (US)

(72) Inventors: Sharath Rao Karikurve, Berkeley, CA (US); Ramasubramanian Balasubramanian, Jersey City, NJ (US); Shrikar Archak, Newark, CA (US)

(73) Assignee: Maplebear Inc., San Francisco, CA (US)

( * ) Notice: Subject to any disclaimer, the term of this patent is extended or adjusted under 35 U.S.C. 154(b) by 530 days.

(21) Appl. No.: 18/100,739

(22) Filed: Jan. 24, 2023

(65) Prior Publication Data

US 2024/0249333 A1     Jul. 25, 2024

(51) Int. Cl.
*G06Q 30/0601* (2023.01)
*G06N 20/00* (2019.01)

(52) U.S. Cl.
CPC ......... *G06Q 30/0631* (2013.01); *G06N 20/00* (2019.01)

(58) Field of Classification Search
CPC . G06Q 30/0631; G06Q 30/0601–0643; G06Q 30/08; G06N 20/00; G06N 3/084
USPC ................................................ 705/26.1–27.2
See application file for complete search history.

(56) References Cited

U.S. PATENT DOCUMENTS

| | | | |
|---|---|---|---|
| 10,861,077 B1 * | 12/2020 | Liu | G06Q 30/06 |
| 2015/0332374 A1 | 11/2015 | Fano et al. | |
| 2019/0236674 A1 * | 8/2019 | Zhao | G06N 7/01 |
| 2020/0380578 A1 | 12/2020 | Xu et al. | |
| 2021/0233143 A1 | 7/2021 | Cho et al. | |
| 2022/0237681 A1 * | 7/2022 | Cai | G06N 20/00 |
| 2022/0366265 A1 * | 11/2022 | Saad | G06Q 30/0202 |

OTHER PUBLICATIONS

Evolving DoorDash's Substitution Recommendation Algorithm , DoorDash blog (2022) (Year: 2022).*

(Continued)

*Primary Examiner* — Ashley D Preston
(74) *Attorney, Agent, or Firm* — Fenwick & West LLP

(57) ABSTRACT

An online concierge system may receive, from a customer, a selection of an item that is associated with a first brand. The online concierge system may extract features associated with the customer and features associated with the item. The online concierge system may input the extracted features to a machine learning model that is trained to predict a degree of association between the customer and the first brand associated with the item. The online concierge system may identify candidate alternatives for replacing the item. The candidate alternatives may include a first alternative that is associated with the first brand and a second alternative that is associated with a second brand different from the first brand. The online concierge system may select, based on the degree of association between the customer and the first brand, one or more candidate alternatives to be presented to the customer to replace the item.

20 Claims, 7 Drawing Sheets

(56) References Cited

OTHER PUBLICATIONS

Machine learning accurately predicts food exchange list and the exchangeable portion, published in Frontiers in 2023 (Year: 2023).*
PCT International Search Report and Written Opinion, PCT Application No. PCT/US2023/82391, Mar. 18, 2024, 8 pages.

* cited by examiner

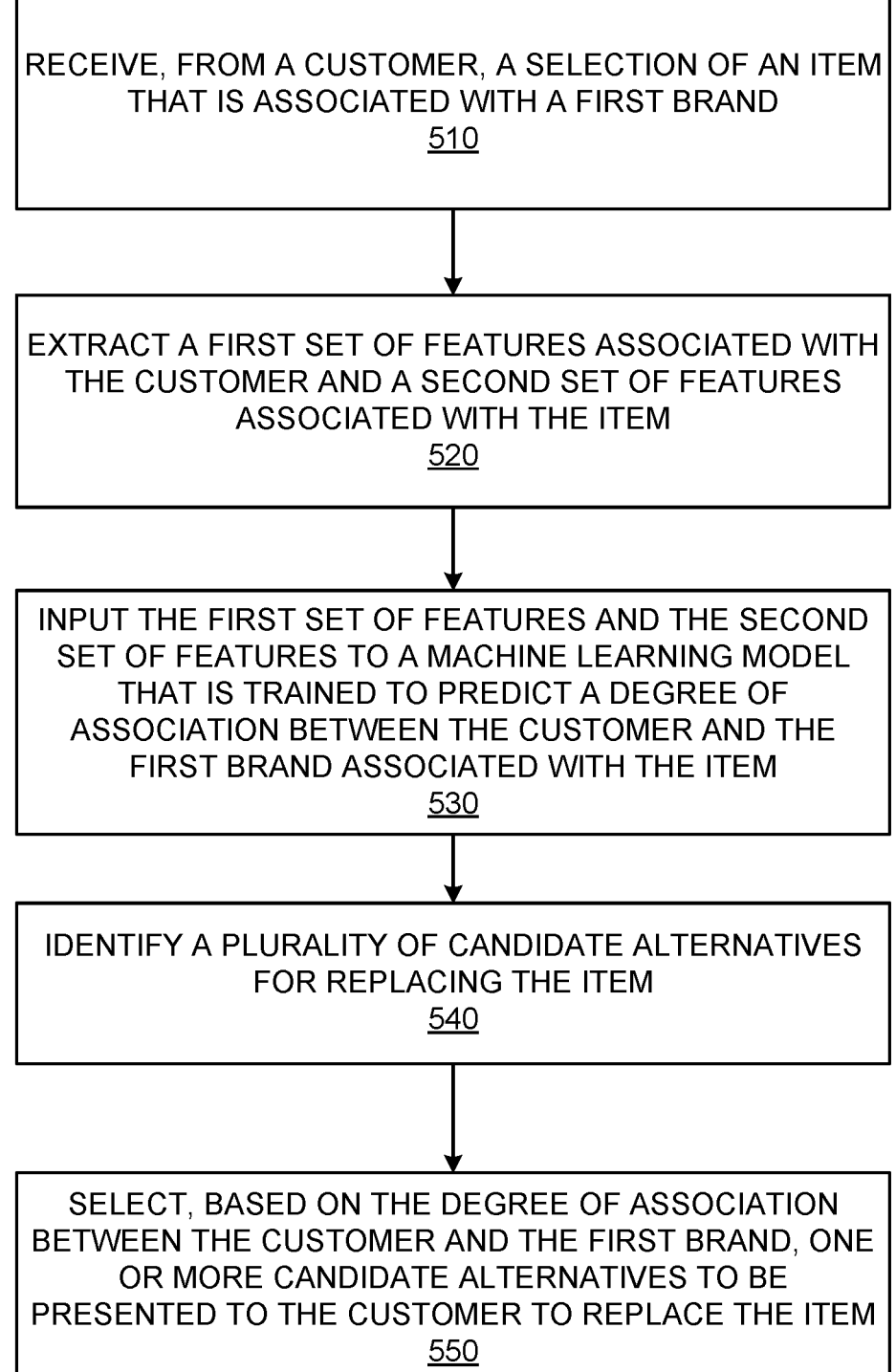

RECEIVE, FROM A CUSTOMER, A SELECTION OF AN ITEM THAT IS ASSOCIATED WITH A FIRST BRAND
510

EXTRACT A FIRST SET OF FEATURES ASSOCIATED WITH THE CUSTOMER AND A SECOND SET OF FEATURES ASSOCIATED WITH THE ITEM
520

INPUT THE FIRST SET OF FEATURES AND THE SECOND SET OF FEATURES TO A MACHINE LEARNING MODEL THAT IS TRAINED TO PREDICT A DEGREE OF ASSOCIATION BETWEEN THE CUSTOMER AND THE FIRST BRAND ASSOCIATED WITH THE ITEM
530

IDENTIFY A PLURALITY OF CANDIDATE ALTERNATIVES FOR REPLACING THE ITEM
540

SELECT, BASED ON THE DEGREE OF ASSOCIATION BETWEEN THE CUSTOMER AND THE FIRST BRAND, ONE OR MORE CANDIDATE ALTERNATIVES TO BE PRESENTED TO THE CUSTOMER TO REPLACE THE ITEM
550

IDENTIFY A FIRST BRAND THAT HAS A SPECIFIC LEVEL
OF ASSOCIATION WITH A CUSTOMER
610

MONITOR ACTIONS PERFORMED BY THE CUSTOMER AT
THE ONLINE CONCIERGE SYSTEM
620

DETERMINE THAT THE CUSTOMER HAS PERFORMED AN
ACTION ASSOCIATED WITH THE FIRST BRAND
630

PRESENT AN ITEM BASED ON THE DEGREE OF
ASSOCIATION WITH THE FIRST BRAND
640

600

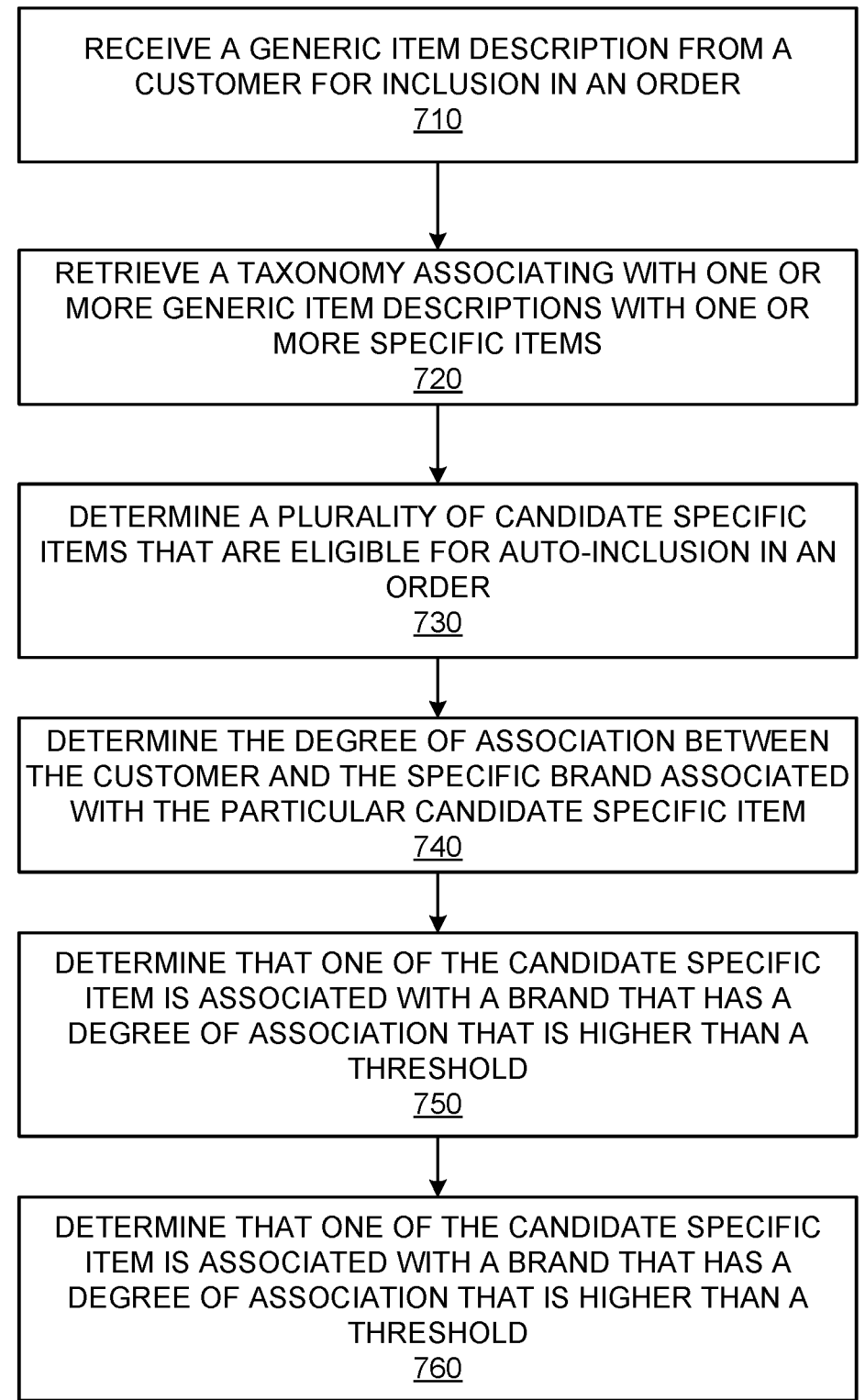

RECEIVE A GENERIC ITEM DESCRIPTION FROM A
CUSTOMER FOR INCLUSION IN AN ORDER
710

RETRIEVE A TAXONOMY ASSOCIATING WITH ONE OR
MORE GENERIC ITEM DESCRIPTIONS WITH ONE OR
MORE SPECIFIC ITEMS
720

DETERMINE A PLURALITY OF CANDIDATE SPECIFIC
ITEMS THAT ARE ELIGIBLE FOR AUTO-INCLUSION IN AN
ORDER
730

DETERMINE THE DEGREE OF ASSOCIATION BETWEEN
THE CUSTOMER AND THE SPECIFIC BRAND ASSOCIATED
WITH THE PARTICULAR CANDIDATE SPECIFIC ITEM
740

DETERMINE THAT ONE OF THE CANDIDATE SPECIFIC
ITEM IS ASSOCIATED WITH A BRAND THAT HAS A
DEGREE OF ASSOCIATION THAT IS HIGHER THAN A
THRESHOLD
750

DETERMINE THAT ONE OF THE CANDIDATE SPECIFIC
ITEM IS ASSOCIATED WITH A BRAND THAT HAS A
DEGREE OF ASSOCIATION THAT IS HIGHER THAN A
THRESHOLD
760

METHOD, NON-TRANSITORY COMPUTER-READABLE MEDIUM, AND SYSTEM FOR INFERRING USER BRAND SENSITIVITY USING A MACHINE LEARNING MODEL

BACKGROUND

This disclosure generally relates to training specialized machine learning models, and more specifically, to machine learning models that can make recommendations.

In a large-scale online system, the system may need to manage numerous items and users who have different behaviors, usage patterns and preferences. The system may include complex relationships among different objects being tracked by the system. While the relationship may provide lots of insights about each customer, the data relationships are often complex and hard to quantify. It is challenging to monitor user preferences concretely and provide high-quality recommendations to take various actions in such a large-scale online system. For even more abstract concepts, such as brand loyalty, conventional systems do not have an effective way to objectively measure such concepts.

SUMMARY

In accordance with one or more aspects of the disclosure, a brand association model may be trained using various machine learning techniques to determine a specific customer-brand association level. For example, the brand association model may be trained using past replacement records. In each past replacement record, an online concierge system may have offered the customer an alternative item to replace an original item. Depending on the customer's choice, the past replacement records may be labeled with different outcomes. The training technique may use a pointwise or a pairwise technique to adjust the weights of the machine learning model.

The trained model may have various applications in different contexts. For example, the online concierge system may receive, from a customer, a selection of an item that is associated with a first brand. The online concierge system may extract features associated with the customer and features associated with the item. The online concierge system may input the extracted features to the brand association model that is trained to predict a degree of association between the customer and the first brand associated with the item. The online concierge system may identify candidate alternatives for replacing the item. The candidate alternatives may include a first alternative that is associated with the first brand and a second alternative that is associated with a second brand different from the first brand. The online concierge system may select, based on the degree of association between the customer and the first brand, one or more candidate alternatives to be presented to the customer to replace the item.

BRIEF DESCRIPTION OF THE DRAWINGS

FIG. 5 is a flowchart depicting an example process for suggesting alternative items for a customer, in accordance with some embodiments.

FIG. 7 is a flowchart depicting an example process for automatically selecting items to a customer, in accordance with some embodiments.

DETAILED DESCRIPTION

Figure 1:
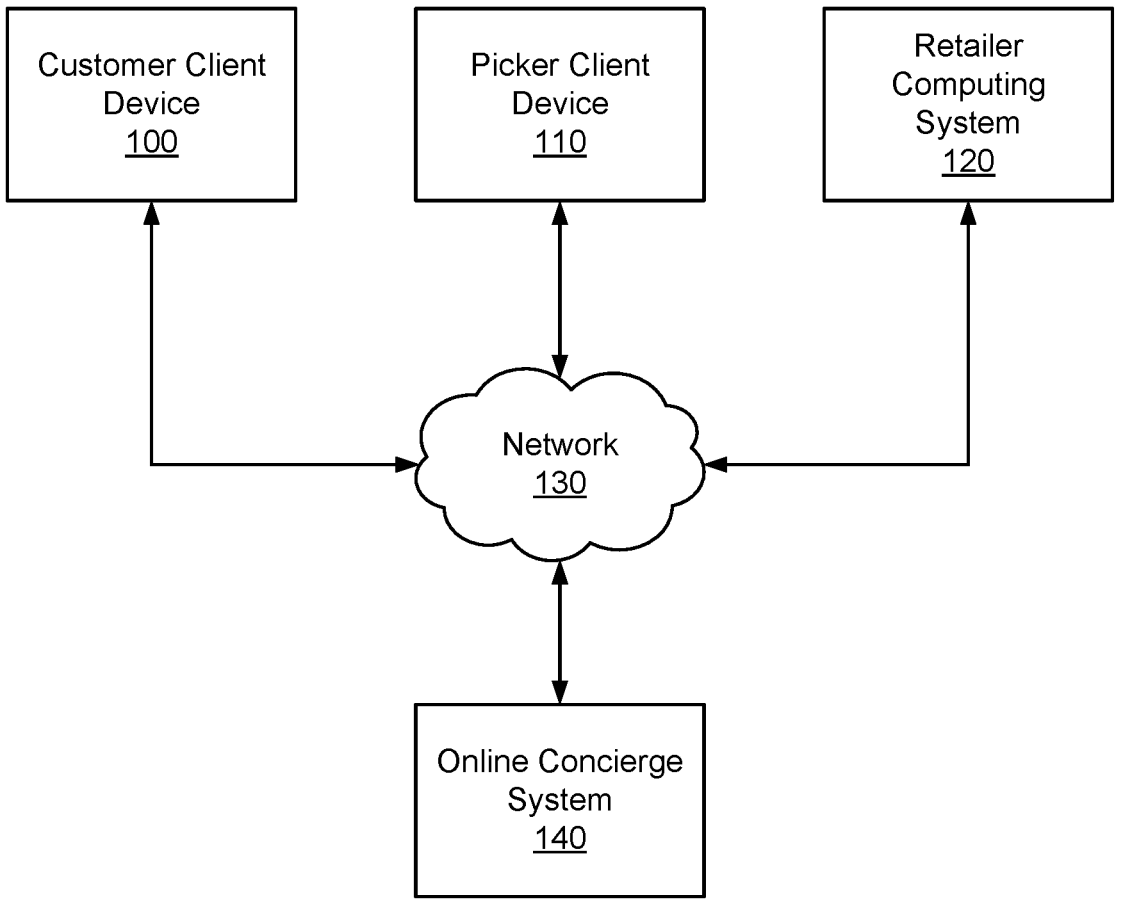
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location" which may be referred to as a warehouse. A warehouse may be a store, a storage location, or other building from which a picker can collect items. A retailer may operate different warehouses that have different item offering and inventory levels. The retailer computing system 120 stores and provides item data to the online concierge system 140 and may regularly update the online concierge system 140 with updated item data. For example, the retailer computing system 120 provides item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
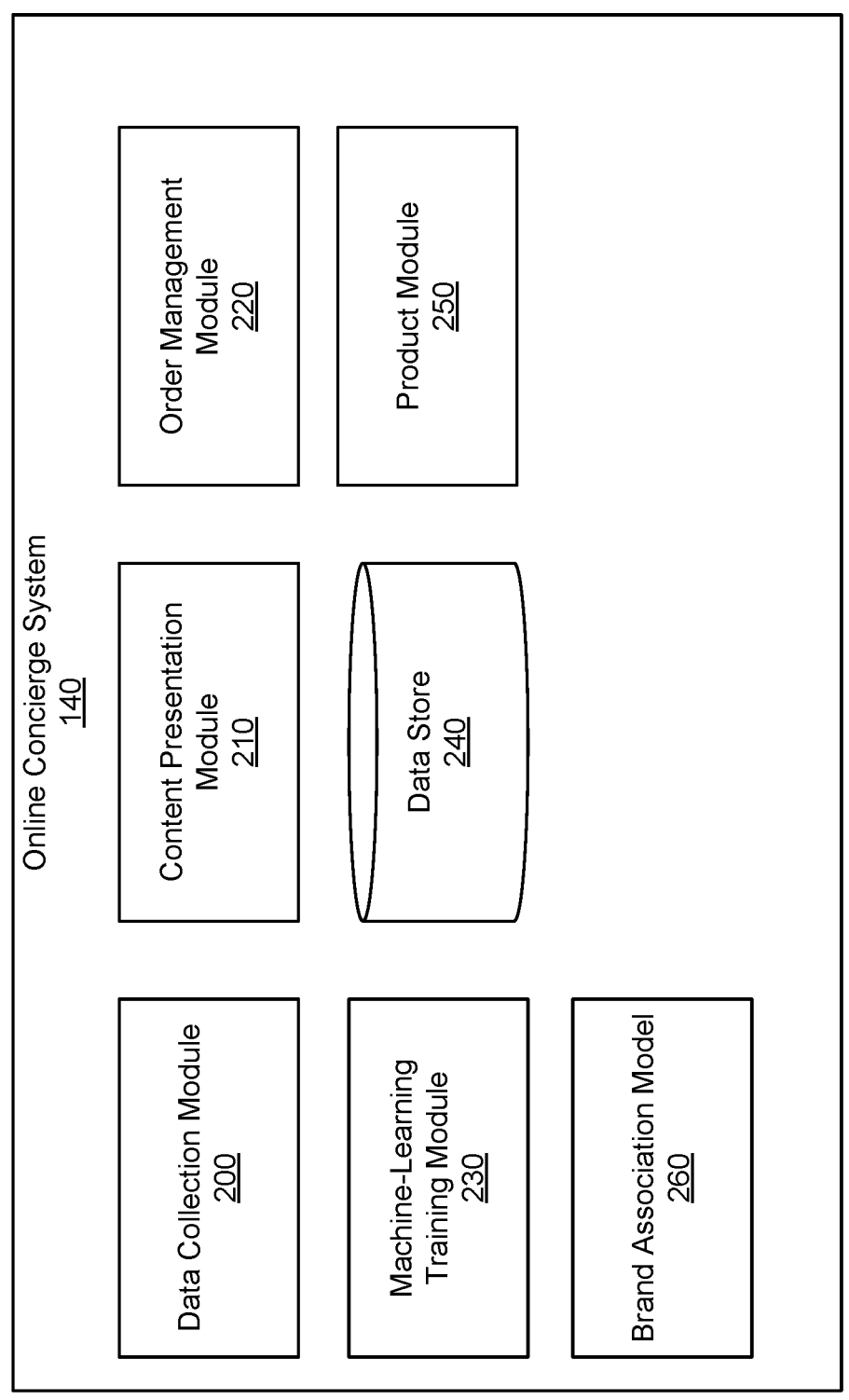
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, a data store 240, a product module 250, and a brand association model 260. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to be collected from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed picking all of the items in an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross entropy loss function. The machine learning training module 230 updates the set of parameters for the machine learning model based on the score generated by the loss function. For example, the machine learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

The product module 250 manages various products and determines product replacement for online concierge system 140. The product module 250 may maintain a taxonomy of products and determine the relationships among the products. In various situations, the product module 250 may identify candidate alternatives for a customer to select to replace an item or add more similar items, such as when the item in an order is unavailable or when additional items are offered as suggestions or sponsored items for the customer to select. The product module 250 may include additional components and will further be discussed in association with FIG. 3. U.S. Patent Application Publication No. 2022/0292567, published on Sep. 15, 2022 entitled "Inferring Categories in a Product Taxonomy Using a Replacement Model," is incorporated by reference herein for all purposes.

The brand association model 260 may include a machine learning model that is used to automatically infer user preferences and loyalty to different brands. The inference may be personalized and specific to each particular customer. The brand association model 260 may be used in association with other modules and models of the online concierge system 140 to improve various suggestions and offerings provided by the online concierge system 140. For example, the brand association model 260 may be used to help selection of alternatives for a customer to replace an item for the product module 250. The online concierge system 140 may also monitor user loyalty to various brands to offer additional features for customers to improve their experiences with the online concierge system 140. Various example uses of the brand association model 260 are further discussed below in association with FIG. 5 through FIG. 7.

Example Product Management Module

Figure 3:
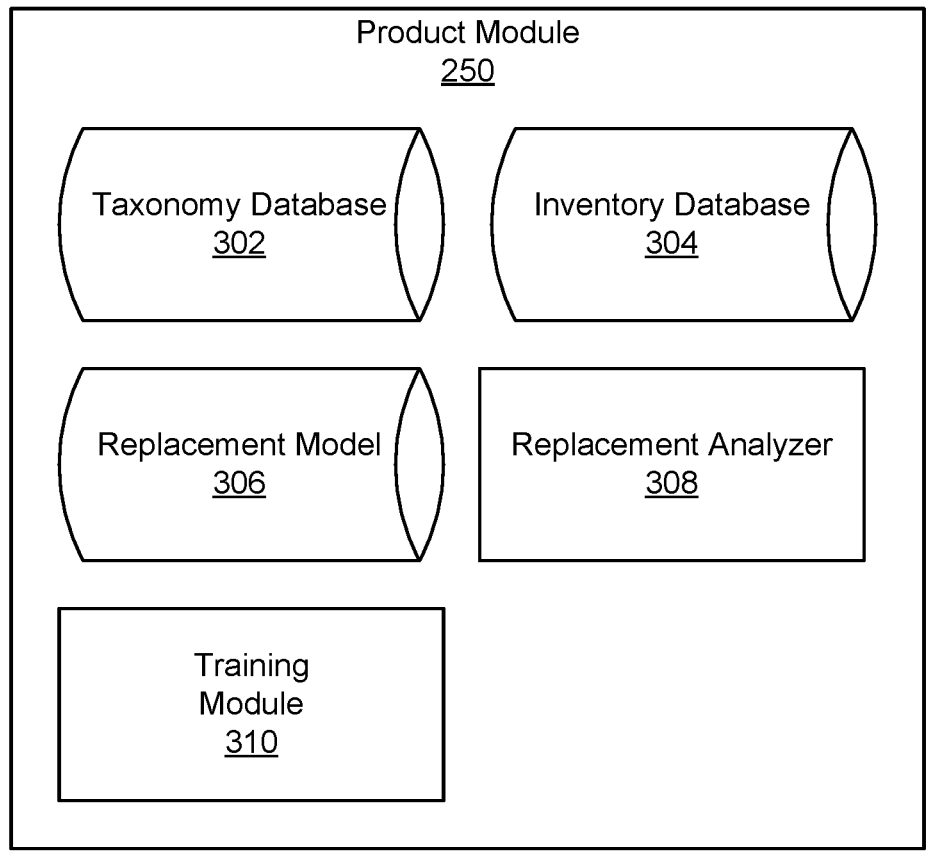
FIG. 3 is a block diagram illustrating an example product engine, in accordance with some embodiments.

FIG. 3 is a block diagram of the product module 250, in accordance with some embodiments. The product module 250 includes a taxonomy database 302, an inventory database 304, a replacement model 306, a replacement analyzer 308, and a training module 310. In some embodiments, the product module 250 may include a different number or variety of modules than those shown in FIG. 3. For example, in some embodiments, the product module 250 may include one or more alternative models that function to label a product with a category of the hierarchical taxonomy.

The replacement analyzer 308 determines replacements for products. Replacements are products that can be alternatively used instead of the product and have similar characteristics to the product. For example, the product "Winston's Whole Wheat Bread" can be replaced with "Bee Honey Wheat Bread" and "Grain Harvest Organic Wheat Bread," which are similar wheat breads of different brands. In another example, a replacement for a "butter" product may be a "ghee" product or an "olive oil" product, which may be used to cook in, similar to the "butter" product. These characteristics of products may be stored in the inventory database 304, as described below.

The replacement analyzer 308 accesses a taxonomy database 302, which stores a hierarchical taxonomy of products sold by retailers associated with the online concierge system 140. The hierarchical taxonomy is a taxonomy of ranked categories of products sold at one or more retailers. Each category may include a plurality of other subcategories (also referred to as "categories" for simplicity) and a plurality of products labeled with the category. For example, the product "Butterfly Organic Butter" may be labeled with the categories "Dairy" and "Butter," where "Butter" is a category of "Dairy." The hierarchical taxonomy may be generated by a machine-learning model trained to determine a hierarchy of products based on retailer information, an inventory of products, historical orders placed by customer, and/or historical search queries entered by customers via the customer client device 100. In some cases, portions of the hierarchical taxonomy may be manually labeled by a moderator.

The replacement analyzer 308 retrieves an unlabeled product from the inventory database 304. The inventory database 304 may contain data of inventory of products available at retailers connected to the online concierge system 140. The unlabeled product is a product available at one or more retailers that is not labeled with (e.g., not included in) a category of a hierarchical taxonomy. The replacement analyzer 308 may confirm that the unlabeled product is not labeled based on the hierarchical taxonomy by cross-referencing the product with the taxonomy database 302. To predict a replacement for the unlabeled product, the replacement analyzer 308 applies a replacement model 306. The online concierge system 140 may use the replacement model 306 to determine one or more replacements for a product when the product is unavailable for purchase via the online concierge system 140. The online concierge system 140 may also use the replacement model 306 to label a product based on the hierarchical taxonomy (e.g., labeling the product based on how replacements for the product are labeled). The replacement model 306 is configured to predict a likelihood that a product is a replacement for an input product. The replacement model 306 may be a machine learning model, such as a deep neural network, a regression model, a classifier, or any other suitable type of machine learning model. In some embodiments, the replacement model 306 is a query system that queries a graph database of historical data describing replacements for products. The historical data may describe search queries entered by customers via the customer client device 100 and products viewed and/or ordered as a result of each search query.

To predict the likelihoods, the replacement model 306 retrieves characteristics of the unlabeled product from the inventory database 304. Characteristics may include types of the product (e.g., different flavors, age, etc.), sizes of the product sold at retailers 120, attributes of the product (e.g., cheese crackers are "snack food" and "cheesy" or the unlabeled product is "kosher," "vegan," etc.), and the like. In some embodiments, the characteristics of the unlabeled product may include name, location at a retailer 120 (e.g., aisle number and/or department), brand, and price. The replacement analyzer 308 selects a set of labeled products as potential replacements for the unlabeled product. In some embodiments, the replacement analyzer 308 selects labeled products with a threshold number of the same characteristics as the unlabeled product. In some embodiments, the set of labeled products are all products in the inventory database 304 or the taxonomy database 302. For each labeled product in the set, the replacement analyzer 308 inputs the labeled product and the unlabeled product, including characteristics of each, to the replacement model 306. Further, in some instances, the replacement analyzer may input features that relate to the user engagement with the products, such as a number of times (or percentage of time) that a labeled product has been used to replace the unlabeled product on the online concierge system 140. The replacement model 306 outputs a likelihood that the labeled product would be used to replace the unlabeled product. For example, the product "Moo Moo Organic 2% Milk" may have a 70% likelihood of being replaced by "Moo Moo 2% Milk" and a 15% likelihood of being replaced by "Moo Moo Organic Whole Milk." The replacement model 306 is trained by the training module 310, which is further described below.

The replacement analyzer 308 receives a likelihood for each of the sets of labeled products from the replacement model 306. The replacement analyzer 308 selects a replacement from the set with the highest likelihood of replacing the unlabeled product. For the selected replacement, the replacement analyzer 308 retrieves, from the taxonomy database 302, one or more categories that the replacement is labeled with based on the hierarchical taxonomy. The replacement analyzer 308 labels the unlabeled product with the one or more categories by adding the newly labeled product to hierarchical taxonomy as stored in the taxonomy database 302.

In an alternate embodiment, the replacement analyzer 308 determines a set of labeled products with a likelihood above a threshold value. For instance, the replacement analyzer 308 may add labeled products with a likelihood of over 85% to the set. The replacement analyzer retrieves, for each labeled product in the set, one or more categories the labeled product is labeled with. The replacement analyzer 308 determines one or more categories for the unlabeled product based on commonality among the retrieved categories and labels the unlabeled product with the one or more categories. For example, if 10 of 11 of the labeled products are labeled with the category "Tea," then the replacement analyzer 308 may label the unlabeled product with the category "Tea." Furthermore, if the replacement analyzer 308 determines that multiple subcategories have commonality, the replacement analyzer may select a subcategory with the highest commonality and only label the unlabeled product with categories related to the selected subcategory.

The replacement model 306 may be trained by a training module 310 using training data describing replacements made by customers. For instance, a customer may have an opportunity to replace a first product with a second product when the first product is unavailable. This may occur in a plurality of scenarios as the customer engages with the customer client device 100, such as when the customer enters a search query for the first product, receives a suggestion of the second product when viewing information about the first product, and the like. Whether or not the customer replaces the first product with the second product may be stored as historical data by the customer client device 100, which the training module 310 may use as training data to train the replacement model 306. For example, if a customer entered the search query "organic milk" and ended up ordering "Smooth Sailing Vanilla Almond Milk" shortly after viewing "Sweet Farms Vanilla Almond Milk," the training data would include the set of "Smooth Sailing Vanilla Almond Milk" and "Sweet Farms Vanilla Almond Milk" labeled with a "1." Further, if the customer also viewed "Store Brand Almond Milk" after viewing "Sweet Farms Vanilla Almond Milk," but did not order "Store Brand Almond Milk," the training data would include the set of "Store Brand Almond Milk" and "Sweet Farms Vanilla Almond Milk" labeled with a "0." Each set may also include the characteristics of each product. The training data comprises a plurality of labeled sets of products viewed by a plurality of customers in the scenarios. The training module 310 trains the replacement model 306 on the labeled sets of products to predict a computed likelihood that a second product is a replacement for the first product.

In some embodiments, the training data may also include historical data representing feedback from customers about products used as replacements. For instance, a customer may provide feedback on a replacement made for a product in an order. In one example, a picker may replace a product upon determining that the product is unavailable at a retailer 120 when shopping. The customer client device 100 may send a notification of the replacement to the customer to approve or deny. Further, upon receiving the order, the customer may enter feedback via the customer client device 100 about the replacement for the product (e.g., whether the customer liked the replacement or not, a rating of the replacement, chat history between a picker and the customer that may be parsed by a natural language processing engine). In another instance, the customer may select a replacement for a product before placing the order (e.g., upon checking out, the customer client device 100 may indicate that a product is unavailable and needs to be replaced). These occurrences of products being replaced may be stored as historical data by the customer client device 100.

The training module 310 may label the historical data to use as training data. This training data comprises a plurality of labeled sets of products viewed by a plurality of customers in the occurrences. For example, if a customer replaced the product "Smooth Sailing Vanilla Almond Milk" with "Sweet Farms Vanilla Almond Milk," the training data would include the set of "Smooth Sailing Vanilla Almond Milk" and "Sweet Farms Vanilla Almond Milk" labeled with a "1." In another example, if the customer rated the replacement "Store Brand Almond Milk" for "Sweet Farms Vanilla Almond Milk" as a 1 out of 5, the training data would include the set of "Store Brand Almond Milk" and "Sweet Farms Vanilla Almond Milk" labeled with a "0." Each set may also include the characteristics of each product. Further, in some embodiments, the training data may include each set of the unlabeled product with each product at a retailer (or each product within a similar department or category of the unlabeled product) labeled with a similarity. The similarity may be a percentage determined based on how many attributes the unlabeled product and product share. For example, the set of products "Red Raspberries" and "Organic Yellow Raspberries" may be labeled with a similarity of 96% due to having many of the same attributes (e.g., both are "fruit," both sold in a "fruit department," etc.). The training module 310 trains the replacement model 306 on the labeled sets of products to predict a computed likelihood that a second product is a replacement for the first product.

Brand Association Machine Learning Model

Figure 4:
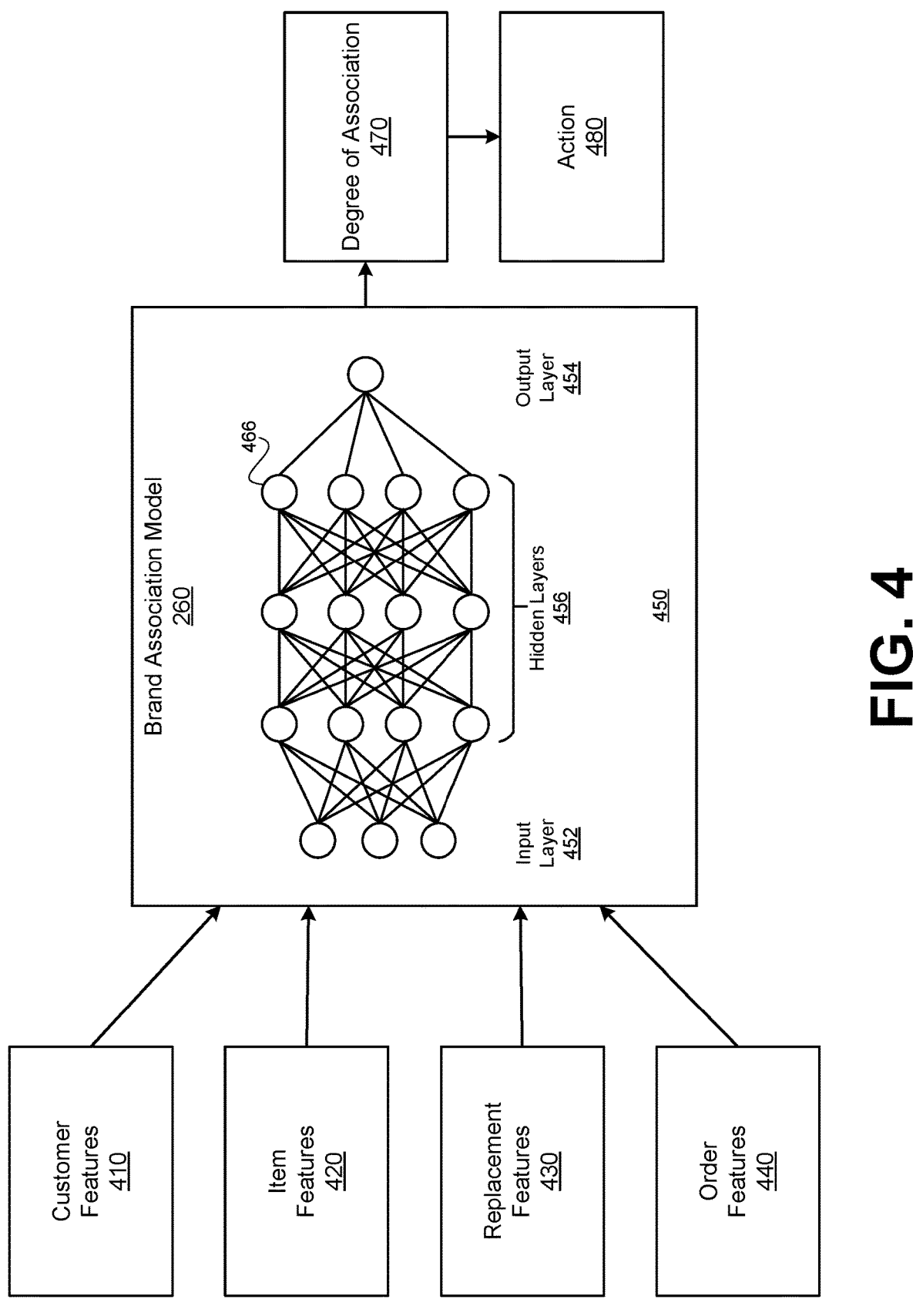
FIG. 4 is a conceptual diagram illustrating the training and making inferences of an example brand association model, in accordance with some embodiments.

FIG. 4 is a conceptual diagram illustrating the training and making inferences of an example brand association model 260, in accordance with some embodiments. The brand association model 260 may take various suitable forms, such as a machine learning model, a heuristic model, a ruled-based model, or a composite model that includes any combination of one or more models. The brand association model 260 may generate a metric that may be referred to as a degree of association between a customer and a brand. The degree of association provides an indication of how much a customer prefers or is loyal to a particular brand. The degree of association may also be an indication of a customer's brand sensitivity with respect to a particular type of product. The brand association model 260 may generate a prediction of brand association that is personalized, brand specific and/or product specific, depending on embodiments.

The online concierge system 140 may receive a selection of an item that is associated with a brand. The selection may vary in different contexts. For example, a selection may simply mean a customer is browsing a particular item in the order interface provided by the online concierge system 140 for the offering of a particular retailer. The online concierge system 140 may use the brand association model 260 to determine the customer preference with respect to brands and suggest additional items for the customer as the customer continues to review various product offerings. In another example, a selection may mean a customer has selected an item in order for a fulfillment order provided by the online concierge system 140. The online concierge system 140 may determine that the selected item is no longer available, such as based on the result of an availability model. In turn, the online concierge system 140 may use the brand association model 260 to help select alternatives to be offered to the customer. In yet another example, a selection may mean a customer is searching for an item. Other situations of how a customer may select an item are also possible.

The online concierge system 140 may extract various features related to the customer's selection. The features may include a first set of customer features 410 that are associated with the customer, a second set of item features 420 that are associated with the item, a third set of replacement features 430 that are associated with past replacement orders, and a fourth set of order features 440 that are associated with historical order data. The precise categorization of the features may vary depending on embodiments. For example, the past replacement orders associated with the customer may be defined as part of the third set of replacement features 430 or as part of the customer features 410. In some embodiments, one or more sets of features may be skipped or additional features may be added. The features may be quantified and normalized and turned into one or more feature vectors to be input into the brand association model 260.

The customer features 410 may include any features that are related to customers. The customers may include the particular customer who makes the selection and other customers, such as those the online concierge system 140 determines to be similar to the particular customer. For example, the features may include brand search history of a customer. For example, if the particular customer typically performs brand searches using the online concierge system 140 in selecting or browsing items, the customer is more likely to be brand sensitive or be more loyal to a brand that the customer has selected before. The online concierge system 140 may also determine, among all of the searches that a customer has performed, the frequency of the searches related to a brand. This feature may be an indication of the brand sensitivity of the customer. Alternatively or additionally, the features may include the chat history of the customer that mentioned any brands. For example, the online concierge system 140 may provide a chat platform for customers to connect and exchange information and for communications between customers and pickers. The online concierge system 140 may monitor the chat history to see if any customers have mentioned any brands. Alternatively or additionally, the features may include the profile of the customer. Alternatively or additionally, the features may include past transaction records of the customer. The transaction records may include browsing history, order history, replacement history, etc. The transaction records may include indications of how many unique brands or unique products a customer bought in the past.

The item features 420 may include any features that are related to items. The items may include the particular item that is selected by a customer or other items, such as those items that are similar to the particular item. For example, the features may include the type of product. The type of product may be defined under a taxonomy of products. Further detail of the taxonomy is discussed in FIG. 3. Under the taxonomy, the features may include an identification of the product type and identification of numbers of similar items available. Each product type may be assigned a degree of brand-dependent uniqueness, depending on the nature of the product. For example, some product types may not be as brand-dependent (e.g., meat, milk, etc.) while the flavors of other product types may vary depending on brands (e.g., cookies, snacks, etc.), thus impacting the degree of brand sensitivity. Alternatively or additionally, the features may include the customers who purchased the item. The record of customers who purchase the item may provide an indication of how unique the item that is associated with a particular brand is because the records for the customers may provide an indication of the uniqueness of the brand or the item. Alternatively or additionally, the features may include features related to the particular brand associated with the selected item. Certain brands may be perceived as premium brands, specialty brands, organic brands, or other brands that may have records of brand loyalty or generally increased popularity among other alternative items. Other brands may be perceived as more generic brands such as private label brands. Alternatively or additionally, the features may include features of other brands that offer competitive products. Alternatively or additionally, the features may include prices, sizes, and quantities of the item, such as the price difference between the selected item and an alternative item, the size difference, the quantity difference, etc. Alternatively or additionally, the features may include the number of alternatives available and other contextual information.

The replacement features 430 may include any features that are related to replacement history associated with customers or items. The customers may include the particular customer who makes the selection or similar customers. The item may be the particular item that is selected by a customer or similar items. For example, the online concierge system 140 may determine the frequency of a customer accepting a same-brand replacement versus the frequency of a customer accepting a different brand replacement. The replacement history may indicate how the customer is brand sensitive. For example, the records of replacement history may indicate that the customer almost always accepts alternatives, therefore indicating the customer is not brand sensitive at all. Alternatively or additionally, the features may include replacement records of the item for different customers. This feature may reveal how generic the item may be perceived among different customers. The online concierge system 140 may retrieve records related to the replacement analyzer 308 to receive replacement records. For example, when the replacement analyzer 308 is applied, the online concierge system 140 may offer an alternative item to a customer to replace the original item. A replacement record may include the outcome of the replacement offer, which may serve as the label of the replacement record. Several outcomes are possible. For example, the customer may select an alternative item that has the same brand as the original item. The customer may select an alternative item that has a different brand than the original item. The customer may also reject any alternative offer (e.g., asking for a refund, insisting to go with the original item even if the availability model predicts that the item may be unavailable, etc.). The replacement records may also be associated with the warehouse location where the item is to be picked up, the time of the order, and the time of delivery. For example, a mid-night order may be driven by an emergency and branding may become less important even for a brand-sensitive customer.

The order features 440 may include any features that are related to historical orders of customers or items. The order records may be customer-specific or item-specific. The patterns of a customer's order history may be an indication of the brand sensitivity of the customer. For example, the customer may select an item of the same brand over and over. Such a record may provide an indication of brand loyalty for the customer with respect to that particular brand and item. The order records specific to a customer may be further divided based on product types. In some cases, a customer may not be sensitive across all product types. In other cases, a customer may be brand sensitive to one type of product but not another type. The order records may also be item-specific. For example, the online concierge system 140 may retrieve order records of the particular item that is selected by a customer and order records of other similar items. The order records may show a pattern of loyalty for a particular item or a generic pattern that shows no particular brand is preferable among different customers.

Various features may be inputted into the brand association model 260 to determine the degree of brand association between a brand and a customer. In various embodiments, a wide variety of machine learning techniques may be used. Examples include different forms of supervised learning, unsupervised learning, and semi-supervised learning such as decision trees, support vector machines (SVMs), regression, Bayesian networks, and genetic algorithms. Deep learning techniques such as neural networks, including convolutional neural networks (CNN), recurrent neural networks (RNN) and long short-term memory networks (LSTM), may also be used. For example, the brand association model 260 in FIG. 4 is illustrated as a neural network 450. However, in other embodiments, the machine learning model associated with the brand association model 260 may also take another form.

In various embodiments, the training techniques for a machine learning model may be supervised, semi-supervised, or unsupervised. In supervised learning, the machine learning models may be trained with a set of training samples that are labeled. For example, for a machine learning model trained to predict brand association, the training set may be past replacement records of replacement items. The labels for each training sample may be binary or multi-class. In the context of replacement records, the label may be the outcome of a past replacement offer. The possible outcomes may include two or more possibilities. For example, the training set may include a first past replacement record where the customer picked another item from the first brand when offered a replacement, a second past replacement record where the customer asked for a refund when offered a replacement, and a third past replacement record where the customer replaced an item associated with the first brand with an item associated with another brand. In some cases, an unsupervised learning technique may be used. The samples used in training are not labeled. Various unsupervised learning techniques such as clustering may be used. In some cases, the training may be semi-supervised with a training set having a mix of labeled samples and unlabeled samples.

A machine learning model may be associated with an objective function, which generates a value that describes the objective goal of the training process. For example, the training may intend to reduce the error rate of the model in generating predictions. In such a case, the objective function may monitor the error rate of the machine learning model. Such an objective function may be called a loss function. Other forms of objective functions may also be used, particularly for unsupervised learning models whose error rates are not easily determined due to the lack of labels. In various embodiments, the error rate may be measured as cross-entropy loss, L1 loss (e.g., the sum of absolute differences between the predicted values and the actual value), L2 loss (e.g., the sum of squared distances).

Referring to FIG. 4, a structure of an example neural network is illustrated, in accordance with some embodiments. The neural network 450 may receive an input and generate an output. The neural network 450 may include different kinds of layers, such as convolutional layers, pooling layers, recurrent layers, fully connected layers, and custom layers. A convolutional layer convolves the input of the layer (e.g., multi-dimensional feature vectors) with one or more kernels to generate different types of images that are filtered by the kernels to generate feature maps. Each convolution result may be associated with an activation function. In some embodiments, a pair of convolutional layers may be followed by a recurrent layer that includes one or more feedback loops. The feedback may be used to account for spatial relationships of the features in text or temporal relationships of objects. The layers may be followed by multiple fully connected layers that have nodes connected to each other. The fully connected layers may be used for classification and object detection. In one embodiment, one or more custom layers may also be presented for the generation of a specific format of the output. The order of layers and the number of layers of the neural network 450 may vary in different embodiments. In various embodiments, a neural network 450 includes one or more layers 452, 454, and 456.

A machine learning model may include certain layers, nodes, such as node 466, kernels and/or coefficients. Training of a neural network may include forward propagation and backpropagation. Each layer in a neural network may include one or more nodes, which may be fully or partially connected to other nodes in adjacent layers. In forward propagation, the neural network performs the computation in the forward direction based on the outputs of a preceding layer. The operation of a node may be defined by one or more functions. The functions that define the operation of a node may include various computation operations such as convolution of data with one or more kernels, pooling, recurrent loop in RNN, various gates in LSTM, etc. The functions may also include an activation function that adjusts the weight of the output of the node. Nodes in different layers may be associated with different functions.

In some embodiments, the training of the brand association model 260 may include generating predictions of outcomes related to the past replacement records and comparing the predictions to the actual outcomes in the past replacement records. For example, the online concierge system 140 may receive a training set that includes a plurality of past replacement records. Each past replacement record may be assigned with labels indicating actions taken by the customer when offered replacements. The actions may correspond to the various outcomes discussed above. Training may include forward propagation and backpropagation. In a forward propagation, the online concierge system 140 may use the machine learning model to generate predicted actions taken by the customer in the past replacement records. Each past replacement record may include features 410 through 440 that were extracted to reflect the conditions of the past replacement records. In a forward propagation, the online concierge system 140 inputs the features of a past replacement record to the machine learning model that has weight values that are not finalized. Using the weight values at the current iteration, the machine learning model generates predicted actions. The online concierge system 140 compares the predicted actions with the labels of the past replacement records. The labels reflect the actual outcomes. In a backpropagation, the online concierge system 140 adjusts the weights of the machine learning model based on the comparison.

More specifically, each of the functions in the neural network 450 may be associated with different coefficients (e.g., weights and kernel coefficients) that are adjustable during training. In addition, some of the nodes in a neural network may also be associated with an activation function that decides the weight of the output of the node in forward propagation. Common activation functions may include step functions, linear functions, sigmoid functions, hyperbolic tangent functions (tanh), and rectified linear unit functions (ReLU). After inputs (e.g., various features discussed above) are provided into the neural network 450 and passed through the neural network 450 in the forward direction, the results may be compared to the training labels or other values in the training set to determine the neural network's performance. The process of prediction may be repeated for other samples in the training sets to compute the value of the objective function in a particular training round. In turn, the neural network performs backpropagation by using gradient descent such as stochastic gradient descent (SGD) to adjust the coefficients in various functions to improve the value of the objective function.

Multiple rounds of forward propagation and backpropagation may be performed. Training may be completed when the objective function has become sufficiently stable (e.g., the machine learning model has converged) or after a predetermined number of rounds for a particular set of training samples. The trained machine learning model can be used for performing prediction, object detection, image segmentation, or another suitable task for which the model is trained.

In some embodiments, the training of the brand association model 260 may use a pairwise learning approach. The pairwise approach may include choosing between two brands for similar items. For example, given two brands of alternative products, the online concierge system 140 determines which brand a customer would pick. The online concierge system 140 may use a learning-to-rank framework in training the brand association model 260 that keeps track of a customer's choice. For example, a customer may initially choose item I of brand A. The online concierge system 140 may offer a replacement J of the same brand A to the customer. If the customer decides to pick replacement J to replace item I, the online concierge system 140 may determine that brand A is preferred over brand B for the customer. In another case, when offered a replacement, the customer may ask for a refund. In response, the online concierge system 140 may also determine that brand A is preferred over other brands. In yet another case, the online concierge system 140 may offer a replacement K of a different brand B to the customer. If the customer accepts the replacement K, the online concierge system 140 may have treated this training sample differently in a pairwise approach.

In a pairwise approach, the training of the brand association model 260 may use an objective function that monitors inversions in predicting the selection of a brand in a pair of offered brands. The machine learning model attempts to minimize the number of inversions from the ground truth (e.g., the actual label in the past replacement record). For example, if in an actual past replacement record the customer prefers brand A over brand B when both brands are shown, the machine learning model will be adjusted in backpropagation to get as many of these pairwise predictions correct as possible. The selection of which brand is preferred over another brand may be done through a scoring method as discussed above. For the labels, when a customer is shown replacement options and if the customer picks an item from the same brand or asks for a refund, the online concierge system 140 can pick a few pairs of training samples such that the current brand is preferred over other brands. If the customer picks another brand over the current brand, the online concierge system 140 may not necessarily regard the customer as more loyal to the alternative brand. For example, the customer may only have chosen the alternative brand because the original choice was not available. This does not mean that the customer is more loyal to the alternative brand than to the original brand. The training sample just shows that the customer is willing to switch and is not as loyal to the original brand. The online concierge system 140 may assign a lower weight to such training samples and a higher weight for those training samples when the customer asked for a refund or picked another item that is also associated with the original brand.

After the brand association model 260 is trained using a pairwise approach, the brand association model 260 may be used to make inferences. The brand association model 260 may predict a score given a user, a brand, and features related to various contexts. In a pairwise approach, a high score would mean that the customer is loyal to the brand. Hence, the degree of association increases with the score.

In some embodiments, the training based on past replacement records may be performed using a point-wise approach. Each outcome of a past replacement record may be assigned a value that may be binary values (e.g., 1 or 0) or may have additional value possibilities (e.g., 0, 1, or 2). In some embodiments, the online concierge system 140 may assign a first value (e.g., 1) if the replacement was with the same brand (e.g., brand switch did not occur). The online concierge system 140 may assign a second value (e.g., 0) different from the first value if the replacement was with a different brand (e.g., brand switch occurred). The online concierge system 140 may assign a third value if a refund was requested. The third value may be the same as the first value or may be different. In some embodiments, the possible outcomes may include other scenarios. For example, in some embodiments, the online concierge system 140 may conduct a real-time survey, when the replacement was offered, asking the customer why the customer would make a certain choice. For example, in one situation, the customer may choose whether she accepted or rejected a replacement based on the brand. In such a case, the online concierge system 140 may assign another value (e.g., 1 or a higher value) to this outcome.

In selecting which one of the items that are associated with two or more different brands to offer to a customer, the online concierge system 140 may rank the items based on scoring. For example, based on past replacement records, the online concierge system 140 may determine which item associated with a particular brand is scored the highest. In choosing whether to offer a replacement with a different brand, the online concierge system 140 may likewise score the two brands to determine which brand has a higher score. The score, or a version of the score such as the score that is adjusted based on statistics or other factors, may be used as the metric that represents the customer's degree of association with a particular brand.

After the brand association model 260 is trained using a pointwise approach, the brand association model 260 may be used to make inferences. The brand association model 260 may predict a score given a user, a brand, and features related to various contexts. In a pointwise approach, a high score would mean that the customer is more brand sensitive and/or loyal to a particular brand.

The online concierge system 140 uses the brand association model 260 to determine a personalized degree of association 470 between a customer and a particular brand. The degree of association 470 may be specific to a customer-brand pair. Different customer-brand pairs may have different degrees of association 470. The degree of association 470 may be represented by a score, which may have a direct or inverse relationship with the degree of association, depending on how the score is defined. For example, the higher the score, the higher is the degree of association between the customer and the brand.

The online concierge system 140 may perform one or more actions 480 based on the determined degree of association 470. For example, the online concierge system 140 may conduct a comparison between the degree of association 470 and a threshold. In response to the comparison indicating that the customer is likely to be loyal to the original brand, the online concierge system 140 may select an alternative that is associated with the original brand and present the alternative to the customer. Other use cases and example actions 480 are described in FIG. 5 through FIG. 7.
Example Processes Based on Brand Association FIG. 5 is a flowchart depicting an example process 500 for suggesting alternative items for a customer, in accordance with some embodiments. Alternative embodiments may include more, fewer, or different steps than the process 500 illustrated in FIG. 5. The steps may also be performed in a different order from the process 500. The process 500 may be performed by a computing server, such as the online concierge system 140. In some embodiments, each of these steps may be performed automatically by the online concierge system without human intervention.

In some embodiments, the online concierge system 140 may receive 510, from a customer, a selection of an item that is associated with a first brand. The selection may vary in different contexts. For example, a selection may simply mean a customer is browsing a particular item in the order interface provided by online concierge system 140 for the offering of a particular retailer. In another example, a selection may mean a customer has selected an item in order for a fulfillment order provided by the online concierge system 140. In yet another example, a selection may mean a customer is searching for an item. Other situations of how a customer may select an item are also possible.

In some embodiments, the online concierge system 140 may extract 520 a first set of features associated with the customer and a second set of features associated with the item. Possible additional or alternative features may include any features described in FIG. 4, including features 410, 420, 430, and 440. The features may be quantified and normalized and turned into one or more feature vectors. Any other suitable pre-processing techniques may also be possible.

In some embodiments, the online concierge system 140 may input 530 the first set of features and the second set of features (or other features) to a machine learning model that is trained to predict a degree of association between the customer and the first brand associated with the item. For example, the machine learning model may be the brand association model 260. The degree of association may be specific to the particular customer-brand pair. The machine learning model may be trained using a training set that includes a past replacement record of a user replacing the item with another item associated with another brand. Further detail of the machine learning model is described in FIG. 4.

In some embodiments, the online concierge system 140 may identify 540 a plurality of candidate alternatives for replacing the item. The plurality of candidate alternatives may include a first alternative that is associated with the first brand and a second alternative that is associated with a second brand different from the first brand. The identification of the plurality of candidate alternatives may be triggered by one or more reasons, depending on the situations and embodiments. For example, the customer may be in the process of building or has completed an order. The online concierge system 140 may determine that the item in the order is unavailable in the inventory. Alternatively or additionally, the online concierge system 140 may determine there is a sponsorship opportunity in presenting the customer a sponsored item as a replacement or in addition to to the existing item. Other triggers are also possible.

In some embodiments, the online concierge system 140 may select 550, based on the degree of association between the customer and the first brand, one or more candidate alternatives to be presented to the customer to replace the item. For example, in response to the degree of association being higher than a threshold, which may indicate a high brand loyalty, the online concierge system 140 may select an alternative item associated with the same first brand to be offered to the customer as a replacement. In response to the degree of association being lower than a threshold, the online concierge system 140 may select an alternative item associated with a different brand or may determine that this is a suitable sponsorship opportunity (e.g., advertisement opportunity) to offer a sponsored item (e.g., an item whose seller/manufacturer is paying the online concierge system 140 to place the item in a more visible location in the order interface).

Figure 6:
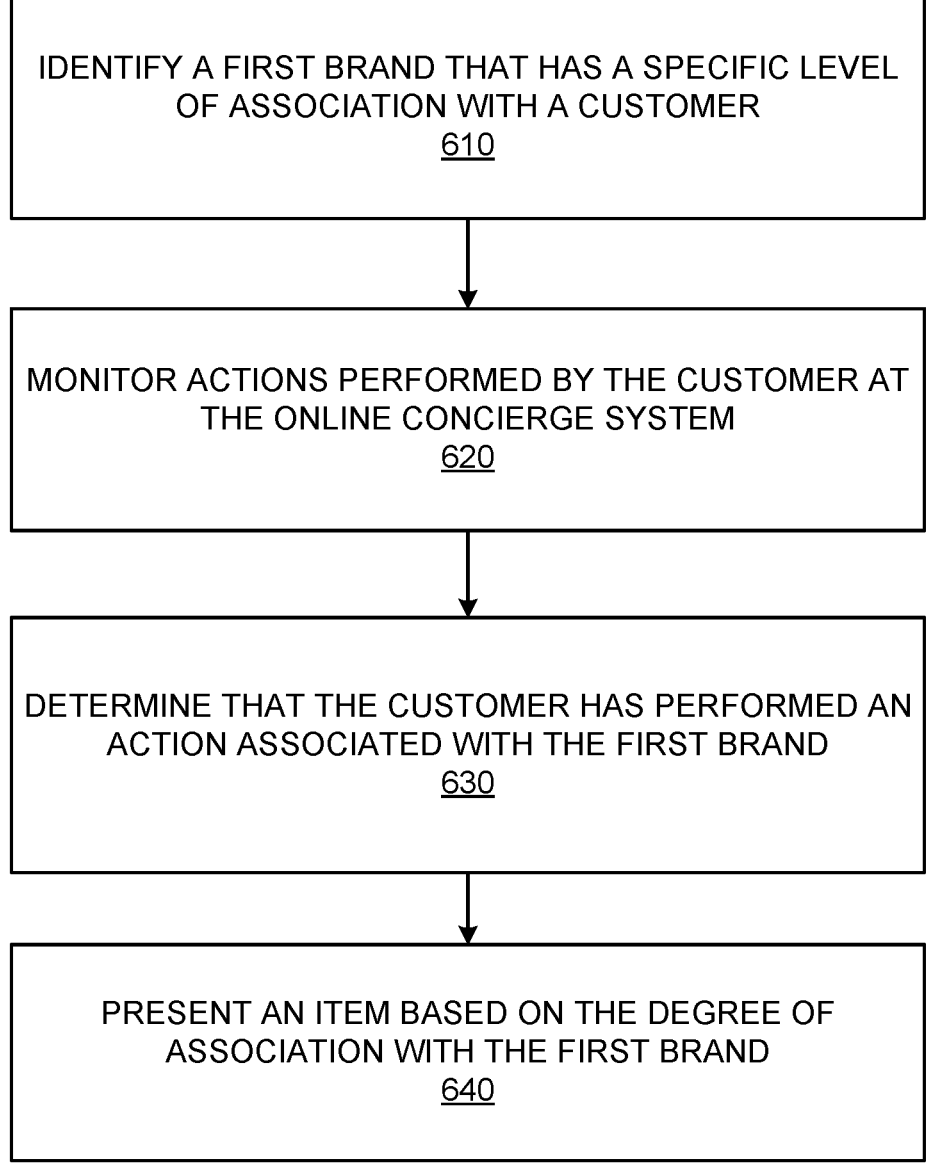
FIG. 6 is a flowchart depicting an example process for presenting sponsor items to a customer, in accordance with some embodiments.

FIG. 6 is a flowchart depicting an example process 600 for presenting a sponsored item to a customer, in accordance with some embodiments. Alternative embodiments may include more, fewer, or different steps than the process 600 illustrated in FIG. 6. The steps may also be performed in a different order from the process 600. The process 600 may be performed by a computing server, such as the online concierge system 140. In some embodiments, each of these steps may be performed automatically by the online concierge system without human intervention.

In some embodiments, the online concierge system 140 may identify 610 a first brand that has a specific level of association with a customer. The determination of the level of association of a specific customer-brand pair may be performed by the brand association model 260. The step 610 may be triggered because of a selection of an item taken by the customer or spontaneously by the online concierge system 140. For example, the online concierge system 140 may conduct an analysis of a customer to determine the customer's top favorite brands or least favorite brands. In some embodiments, the specific level of association may be a high level that indicates a high level of brand loyalty. The specific level of association may be a low level that indicates the customer may be insensitive to the brand. Whether a specific level of association is high or low may be relative to a threshold.

In some embodiments, the online concierge system 140 may monitor 620 actions performed by the customer at the online concierge system 140. For example, the online concierge system 140 may try to find an opportunity to present items or contents to the customer. The action may be different in various contexts, such as user browsing, searching, making an order, entering a chat, and other actions. In some embodiments, the online concierge system 140 may determine 630 that the customer has performed an action associated with the first brand. For example, the customer may have selected an item that is associated with the first brand. In some cases, the customer may also directly search or discuss the first brand.

In some embodiments, the online concierge system 140 may present 640 an item based on the degree of association with the first brand. The item may be a sponsored item. The online concierge system 140 may monitor the actions of the customer and attempt to find opportunities to present sponsored items. Whether the item presented to the customer is associated with the same first brand or another brand may depend on the level of association of the customer with the first brand.

By way of example, in response to the level of association being high (e.g., higher than a predetermined threshold), the online concierge system 140 may show advertisements or other sponsored content from the same first brand for products that the customer has not purchased or has not browsed. In some embodiments, the online concierge system 140 may determine that the first brand and a second brand are similar and the customer is loyal to the first brand, the online concierge system 140 may present sponsored items associated with the second brand. In some embodiments, the online concierge system 140 may determine that the customer is not loyal to the first brand. As such, the system may show sponsored items associated with a second brand which is similar to the first brand. In some embodiments, if the first brand that the customer is loyal to releases a new product, the online concierge system 140 may push updates about the product to the customer. As such, instead of having the user manually follow a brand, the online concierge system 140 may learn the user's preference and update the user automatically.

The online concierge system 140 may also provide suggestions to bid for an advertiser based on brand loyalty. For example, the online concierge system 140 may suggest to the advertiser to lower the bid if it is determined that the customer is very loyal to the brand. The degree of association may also be used as a targeting feature that advertisers may select when the advertisers are running an advertisement campaign.

Some brand associations may go across categories. For example, if a customer buys an item associated with a first brand in a first category, but has not shown to have purchased items of the same first brand in the second category. The online concierge system 140 may show the customer advertisement for the items in the second category that are associated with the same first brand.

In response to the level of association being low for the first brand, the online concierge system 140 may present the customer with sponsored items from different brands. The online concierge system 140 may also rank search results differently based on the level of association with different brands. If the degree of association is low, in response to the customer searching for an item, the online concierge system 140 may show an advertisement for a competitor's brand and encourage the customer to switch and purchase the new brand.

FIG. 7 is a flowchart depicting an example process 700 for automatically selecting a specific item for a customer, in accordance with some embodiments. Alternative embodiments may include more, fewer, or different steps than the process 700 illustrated in FIG. 7. The steps may also be performed in a different order from the process 700. The process 700 may be performed by a computing server, such as the online concierge system 140. In some embodiments, each of these steps may be performed automatically by the online concierge system without human intervention.

In some embodiments, the online concierge system 140 may receive 710 a generic item description from a customer for inclusion in an order. A generic item description may be a common name of an item (e.g., milk, corn, peanut butter). For example, the online concierge system 140 may receive the generic item description from the customer as the customer is building a cart by entering the generic name into a query box provided by the online concierge system 140 in the order interface.

In some embodiments, the online concierge system 140 may retrieve 720 a taxonomy associating one or more generic item descriptions with one or more specific items. Further examples of product taxonomy are described in FIG. 3. While a generic item description may be a generic name of a product, each generic item description may be associated with a plurality of specific items. Each specific item may be associated with a particular brand. For example, the user may enter the generic name "2% milk" and, under the 2% milk category, there can be multiple options each associated with a particular brand.

In some embodiments, the online concierge system 140 may determine 730 a plurality of candidate specific items that are eligible for auto-inclusion in an order. For example, the online concierge system 140, from the taxonomy, may retrieve a list of candidate specific items. In some embodiments, the determination that a specific item matches the generic item description may be determined by a machine learning model. U.S. Patent Application Publication No. 2022/0358560, published on Nov. 10, 2022, entitled "Selecting an Item for Inclusion in an Order from a User of an Online Concierge System from a Generic Item Description Received from the User," is incorporated by reference herein for all purposes. The online concierge system 140 may in turn use the item availability model to predict the availability of each of the candidate specific items. Those available items may be eligible for further consideration.

In some embodiments, for each of the available candidate specific items, the online concierge system 140 may determine 740 the degree of association between the customer and the specific brand associated with the particular candidate specific item. For example, the online concierge system 140 may use the brand association model 260 to generate the degree of association for a particular customer-brand pair.

In some embodiments, the online concierge system 140 may determine 750 that one of the candidate specific items is associated with a brand that has a degree of association that is higher than a threshold. This may indicate that the brand has a very high degree of association and the customer is loyal to the brand.

In some embodiments, the online concierge system 140 may automatically select 760 the candidate specific item that is associated with a brand to which the customer is highly loyal to include in the order. The inclusion may be performed without additional input from the customer after the customer provides the generic item description. As such, the process 700 allows the online concierge system 140 to automatically select and include a specific item to a customer's order after the customer provides a generic item description. For example, after the customer enters the generic item description "angel hair," the online concierge system 140 may automatically select the item that the customer often orders based on the brand loyalty determination. The online concierge system 140 may automatically include the selected item in an order or may present the item to the customer to ask the customer to make a choice (e.g., selecting the item in an order, ranking the item at the top while returning a list of items, etc.).

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A computer-implemented method, comprising, at a computer system comprising a processor and a computer-readable medium:

receiving, from a customer, a selection of an item that is associated with a first brand;

extracting a first set of features associated with the customer and a second set of features associated with the item;

inputting the first set of features and the second set of features to a brand-association machine learning model that is trained to predict a degree of association between the customer and the first brand associated with the item, the degree of association being specific to the customer, wherein the brand-association machine learning model is trained using a pairwise learning-to-rank training that comprises;

obtaining past replacement records each comprising a customer choice when offered a replacement item;

generating training samples by comparing a first brand associated with an original item and a second brand associated with a replacement item;

assigning higher weights to training samples where the customer selected a replacement item associated with the same brand as the original item or requested a refund, and assigning lower weights to training samples where the customer selected a replacement item associated with a different brand; and minimizing inversions between predicted brand preferences and actual customer choices by adjusting model weights through backpropagation based on the weighted training samples;

identifying a plurality of candidate alternatives for replacing the item, the plurality of candidate alternatives comprising a first alternative that is associated with the first brand and a second alternative that is associated with a second brand different from the first brand;

predicting, using an availability machine-learning model that is trained to output an availability score for an item at a physical store location, a plurality of availability scores that respectively indicates a likelihood that a candidate alternative in the plurality of candidate alternatives is in stock at the physical store location;

computing composite replacement scores that are functions of the availability scores predicted by the availability machine learning model and the degree of association predicted by the brand-association machine learning model; and selecting, based on the degree of association between the customer and the first brand, one or more candidate alternatives to be presented to the customer to replace the item.

2. The computer-implemented method of claim 1, wherein training of the brand-association machine learning model comprises:

classifying the pairwise learning-to-rank training as at least two categories, a first category associated past replacement records indicating that a brand switch occurred and a second category associated past replacement records indicating a brand switch did not occur; and predicting the degree of association using the two categories.

3. The computer-implemented method of claim 1, wherein training of the brand-association machine learning model comprises:

receiving the pairwise learning-to-rank training that comprises a plurality of past replacement records, each past replacement records assigned with labels indicating actions taken by the customer when offered replacements;

using, in a forward propagation, the brand-association machine learning model to generate predicted actions taken by the customer in the past replacement records;

comparing the predicted actions with the labels of the past replacement records; and adjusting, in a backpropagation, weights of the brand-association machine learning model based on the comparing.

4. The computer-implemented method of claim 1, wherein the pairwise learning-to-rank training comprises a first past replacement record where the customer picked another item from the first brand when offered a replacement, a second past replacement record where the customer asked for a refund when offered a replacement, and a third past replacement record where the customer replaced an item associated with the first brand with an item associated with another brand.

5. The computer-implemented method of claim 1, wherein the first set of features is selected from one or more of: brand search history of the customer, chat history of the customer that mentioned any brands, profile of the customer, or past transaction records of the customer.

6. The computer-implemented method of claim 1, wherein the second set of features is selected from one or more of: type of product, customers who purchased the item, features of the first brand, or features of other brands that offer competitive products.

7. The computer-implemented method of claim 1, further comprising:

conducting a comparison between the degree of association and a threshold; and responsive to the comparison indicating that the degree of association is higher than the threshold, selecting the first alternative that is associated with the first brand to be presented to the customer.

8. The computer-implemented method of claim 1, wherein identifying the plurality of candidate alternatives comprises:

retrieving a taxonomy of products, wherein the item is defined as a type of product under the taxonomy; and identifying the candidate alternatives under the type of product defined under the taxonomy.

9. The computer-implemented method of claim 1, wherein one of the candidate alternatives selected to be presented to the customer is a sponsored item.

10. The computer-implemented method of claim 1, wherein selecting one or more candidate alternatives to be presented to the customer to replace the item is in response to determining that the item is unavailable.

11. A non-transitory computer-readable medium configured to store code comprising instructions, the instructions, when executed by a processor, cause the processor to:

receive, from a customer, a selection of an item that is associated with a first brand;

extract a first set of features associated with the customer and a second set of features associated with the item;

input the first set of features and the second set of features to a brand-association machine learning model that is trained to predict a degree of association between the customer and the first brand associated with the item, the degree of association being specific to the customer, wherein the brand-association machine learning model is trained using pairwise learning-to-rank training that comprises:

obtaining past replacement records each comprising a customer choice when offered a replacement item;

generating training samples by comparing a first brand associated with an original item and a second brand associated with a replacement item;

assigning higher weights to training samples where the customer selected a replacement item associated with the same brand as the original item or requested a refund, and assigning lower weights to training samples where the customer selected a replacement item associated with a different brand; and minimizing inversions between predicted brand preferences and actual customer choices by adjusting model weights through backpropagation based on the weighted training samples;

identify a plurality of candidate alternatives for replacing the item, the plurality of candidate alternatives comprising a first alternative that is associated with the first brand and a second alternative that is associated with a second brand different from the first brand;

predict, using an availability machine-learning model that is trained to output an availability score for an item at a physical store location, a plurality of availability scores that respectively indicates a likelihood that a candidate alternative in the plurality of candidate alternatives is in stock at the physical store location;

compute composite replacement scores that are functions of the availability scores predicted by the availability machine learning model and the degree of association predicted by the brand-association machine learning model; and select, based on the degree of association between the customer and the first brand, one or more candidate alternatives to be presented to the customer to replace the item.

12. The non-transitory computer-readable medium of claim 11, wherein training of the brand-association machine learning model comprises:

classifying the pairwise learning-to-rank training as at least two categories, a first category associated past replacement records indicating that a brand switch occurred and a second category associated past replacement records indicating a brand switch did not occur; and predicting the degree of association using the two categories.

13. The non-transitory computer-readable medium of claim 11, wherein training of the brand-association machine learning model comprises:

receiving the pairwise learning-to-rank training that comprises a plurality of past replacement records, each past replacement records assigned with labels indicating actions taken by the customer when offered replacements;

using, in a forward propagation, the brand-association machine learning model to generate predicted actions taken by the customer in the past replacement records;

comparing the predicted actions with the labels of the past replacement records; and adjusting, in a backpropagation, weights of the brand-association machine learning model based on the comparing.

14. The non-transitory computer-readable medium of claim 11, wherein the pairwise learning-to-rank training comprises a first past replacement record where the customer picked another item from the first brand when offered a replacement, a second past replacement record where the customer asked for a refund when offered a replacement, and a third past replacement record where the customer replaced an item associated with the first brand with an item associated with another brand.

15. The non-transitory computer-readable medium of claim 11, wherein the first set of features is selected from one or more of: brand search history of the customer, chat history of the customer that mentioned any brands, profile of the customer, or past transaction records of the customer.

16. The non-transitory computer-readable medium of claim 11, wherein the second set of features is selected from one or more of: type of product, customers who purchased the item, features of the first brand, or features of other brands that offer competitive products.

17. The non-transitory computer-readable medium of claim 11, wherein identifying the plurality of candidate alternatives comprises:

retrieving a taxonomy of products, wherein the item is defined as a type of product under the taxonomy; and identifying the candidate alternatives under the type of product defined under the taxonomy.

18. The non-transitory computer-readable medium of claim 11, wherein one of the candidate alternatives selected to be presented to the customer is a sponsored item.

19. The non-transitory computer-readable medium of claim 11, wherein selecting one or more candidate alternatives to be presented to the customer to replace the item is in response to determining that the item is unavailable.

20. A system comprising:

a processor; and memory configured to store code comprising instructions, wherein the instructions, when executed by the processor, cause the processor to:

receive, from a customer, a selection of an item that is associated with a first brand;

extract a first set of features associated with the customer and a second set of features associated with the item;

input the first set of features and the second set of features to a brand-association machine learning model that is trained to predict a degree of association between the customer and the first brand associated with the item, the degree of association being specific to the customer, wherein the brand-association machine learning model is trained using pairwise learning-to-rank training that comprises:

obtaining past replacement records each comprising a customer choice when offered a replacement item;

generating training samples by comparing a first brand associated with an original item and a second brand associated with a replacement item;

assigning higher weights to training samples where the customer selected a replacement item associated with the same brand as the original item or requested a refund, and assigning lower weights to training samples where the customer selected a replacement item associated with a different brand; and minimizing inversions between predicted brand preferences and actual customer choices by adjusting model weights through backpropagation based on the weighted training samples;

identify a plurality of candidate alternatives for replacing the item, the plurality of candidate alternatives comprising a first alternative that is associated with the first brand and a second alternative that is associated with a second brand different from the first brand;

predict, using an availability machine-learning model that is trained to output an availability score for an item at a physical store location, a plurality of availability scores that respectively indicates a likelihood that a candidate alternative in the plurality of candidate alternatives is in stock at the physical store location;

compute composite replacement scores that are functions of the availability scores predicted by the availability machine learning model and the degree of association predicted by the brand-association machine learning model; and select, based on the degree of association between the customer and the first brand, one or more candidate alternatives to be presented to the customer to replace the item.

* * * * *